(12) United States Patent
Sassano et al.

(10) Patent No.: US 12,460,662 B2
(45) Date of Patent: Nov. 4, 2025

(54) LATCHING A REMOVABLE ELEMENT WITH TOLERANCE-STACK COMPLIANCE

(71) Applicant: INTERNATIONAL BUSINESS MACHINES CORPORATION, Armonk, NY (US)

(72) Inventors: Camillo Sassano, Durham, NC (US); Arthur J. Higby, Cottekill, NY (US); John Torok, Poughkeepsie, NY (US); Khaalid Persaud Juggan McMillan, Poughkeepsie, NY (US); Franklin Gurney, Rhinebeck, AL (US); Sterett Baxter Schanze, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 18/492,039

(22) Filed: Oct. 23, 2023

(65) Prior Publication Data

US 2025/0129808 A1   Apr. 24, 2025

(51) Int. Cl.
*F16B 2/18* (2006.01)
*H05K 7/14* (2006.01)

(52) U.S. Cl.
CPC .............. *F16B 2/18* (2013.01); *H05K 7/1489* (2013.01)

(58) Field of Classification Search
CPC ... G06F 1/16; G06F 1/18; G06F 1/184; G06F 1/187; G11B 33/122; G11B 33/123; G11B 33/124; G11B 33/128; H05K 5/00; H05K 7/14; H05K 7/1405; H05K 7/1409; H05K 7/1411; H05K 7/1418
See application file for complete search history.

(56) References Cited

U.S. PATENT DOCUMENTS 3,476,258 A * 11/1969 Dorsett ................ H05K 7/1409
                                                   439/157
4,083,616 A * 4/1978 McNiece ........... H01R 12/7005
                                                   439/157

(Continued)

FOREIGN PATENT DOCUMENTS

WO      2010098774 A1    9/2010

OTHER PUBLICATIONS

N. Eckenstein and M. Yim, "Design, principles, and testing of a latching modular robot connector," 2014 IEEE/RSJ International Conference on Intelligent Robots and Systems, Chicago, IL, USA, 2014, pp. 2846-2851, doi: 10.1109/IROS.2014.6942953.

*Primary Examiner* — Daniel J Wiley
(74) *Attorney, Agent, or Firm* — David K. Mattheis

(57) ABSTRACT

Embodiments are disclosed for a latch assembly apparatus. The latch assembly apparatus includes an effort arm, latch housing, a fulcrum, and a torsion spring. The latch housing includes a resistance arm having a claw portion, and an ejection arm. The torsion spring is configured to provide a rotational force around the fulcrum, and on the resistance arm, resulting from a tensioning of the torsion spring between a first end of the torsion spring fixed to the effort arm, and a second end of the torsion spring fixed to a predetermined preload hole disposed on the latch housing. Further, when the latch assembly apparatus is mounted to a removable element, and the removable element is placed in a connection with a drawer element by the latch assembly apparatus, the resistance arm applies a preload to the connection.

20 Claims, 10 Drawing Sheets

(56) References Cited

U.S. PATENT DOCUMENTS

| | | | | |
|---|---|---|---|---|
| 4,602,835 | A * | 7/1986 | Bauer | H05K 7/14 |
| | | | | 439/325 |
| 4,614,389 | A * | 9/1986 | Albert | H01R 13/62933 |
| | | | | 439/157 |
| 4,702,535 | A * | 10/1987 | Beun | H05K 7/1409 |
| | | | | 312/308 |
| 4,840,570 | A * | 6/1989 | Mann, Jr. | H05K 7/1461 |
| | | | | 439/372 |
| 4,893,301 | A * | 1/1990 | Andrews | H04M 3/523 |
| | | | | 370/364 |
| 4,902,239 | A * | 2/1990 | Schindler | H05K 7/1409 |
| | | | | 439/153 |
| 4,996,631 | A * | 2/1991 | Freehauf | H05K 7/1409 |
| | | | | 439/157 |
| 5,140,501 | A * | 8/1992 | Takahashi | H05K 7/1409 |
| | | | | 361/740 |
| 5,504,656 | A * | 4/1996 | Joist | H05K 7/1409 |
| | | | | 361/801 |
| 5,587,888 | A * | 12/1996 | Joist | H05K 7/1409 |
| | | | | 361/802 |
| 6,058,579 | A * | 5/2000 | Brocklesby | H05K 7/1409 |
| | | | | 340/687 |
| 6,067,225 | A * | 5/2000 | Reznikov | H05K 7/1418 |
| 6,094,353 | A * | 7/2000 | Koerber | H01R 13/62933 |
| | | | | 361/801 |
| 6,102,499 | A * | 8/2000 | Chen | H05K 7/1411 |
| 6,147,872 | A * | 11/2000 | Roy | H05K 7/1409 |
| | | | | 361/801 |
| 6,168,214 | B1 * | 1/2001 | Lambert | E05C 3/08 |
| | | | | 292/336.3 |
| 6,185,106 | B1 * | 2/2001 | Mueller | H05K 7/1409 |
| | | | | 361/801 |
| 6,266,248 | B1 * | 7/2001 | Hanas | H05K 7/1409 |
| | | | | 361/752 |
| 6,356,441 | B1 * | 3/2002 | Claprood | H05K 7/1411 |
| | | | | 361/801 |
| 6,443,315 | B1 * | 9/2002 | Tabuchi | H01R 13/62961 |
| | | | | 361/740 |
| 6,456,501 | B1 * | 9/2002 | Rubenstein | G11B 33/128 |
| | | | | 361/801 |
| 6,512,679 | B1 | 1/2003 | Shearman | |
| 6,582,241 | B1 * | 6/2003 | Lutz, Jr. | H01R 12/7005 |
| | | | | 439/157 |
| 6,616,106 | B1 * | 9/2003 | Dean | G06F 1/184 |
| 6,633,486 | B2 * | 10/2003 | Coles | H05K 7/1409 |
| | | | | 360/137 |
| 6,882,526 | B2 * | 4/2005 | Neukam | H05K 7/1411 |
| 6,948,967 | B2 * | 9/2005 | Scherer | G11B 33/128 |
| 6,970,350 | B2 * | 11/2005 | Schmid | G06F 1/184 |
| | | | | 211/41.17 |
| 7,023,693 | B2 * | 4/2006 | Yuan | G06F 1/184 |
| 7,142,432 | B2 * | 11/2006 | Koerber | H01R 13/62933 |
| | | | | 361/740 |
| 7,272,012 | B2 * | 9/2007 | Salinas | H05K 7/1411 |
| | | | | 312/223.1 |
| 7,292,457 | B2 | 11/2007 | DeNies | |
| 7,301,778 | B1 * | 11/2007 | Fang | H05K 7/1409 |
| | | | | 361/801 |
| 7,318,532 | B1 | 1/2008 | Lee | |
| 7,319,597 | B2 * | 1/2008 | Liu | H05K 7/1409 |
| | | | | 361/752 |
| 7,453,698 | B2 * | 11/2008 | Cox | H05K 7/1411 |
| | | | | 361/726 |
| 7,455,539 | B2 * | 11/2008 | Gunther | H05K 7/1414 |
| | | | | 439/157 |
| 7,515,428 | B2 * | 4/2009 | Tang | H05K 7/14325 |
| | | | | 439/160 |
| 7,755,887 | B2 * | 7/2010 | Chen | G06F 1/187 |
| | | | | 361/679.33 |
| 8,369,094 | B2 * | 2/2013 | McLean | H05K 7/1409 |
| | | | | 361/747 |
| 8,605,440 | B2 * | 12/2013 | Gong | H05K 7/1409 |
| | | | | 361/726 |
| 8,641,313 | B1 * | 2/2014 | Crippen | H05K 5/0221 |
| | | | | 403/322.1 |
| 8,708,720 | B2 * | 4/2014 | Engelvin | F16B 2/14 |
| | | | | 439/160 |
| 8,811,026 | B2 * | 8/2014 | Engelvin | H05K 7/1409 |
| | | | | 361/759 |
| 10,206,302 | B2 | 2/2019 | Liao | |
| 11,432,417 | B2 | 8/2022 | Hilliard | |
| 2003/0184964 | A1 * | 10/2003 | Neukam | G06F 1/184 |
| 2006/0215373 | A1 * | 9/2006 | Joist | H05K 7/1409 |
| | | | | 361/726 |
| 2008/0025000 | A1 * | 1/2008 | Huang | H05K 7/1409 |
| | | | | 361/726 |
| 2009/0279249 | A1 * | 11/2009 | Crippen | G11B 33/124 |
| | | | | 361/679.58 |
| 2014/0254106 | A1 * | 9/2014 | Baquiano | H05K 5/0221 |
| | | | | 361/726 |

* cited by examiner

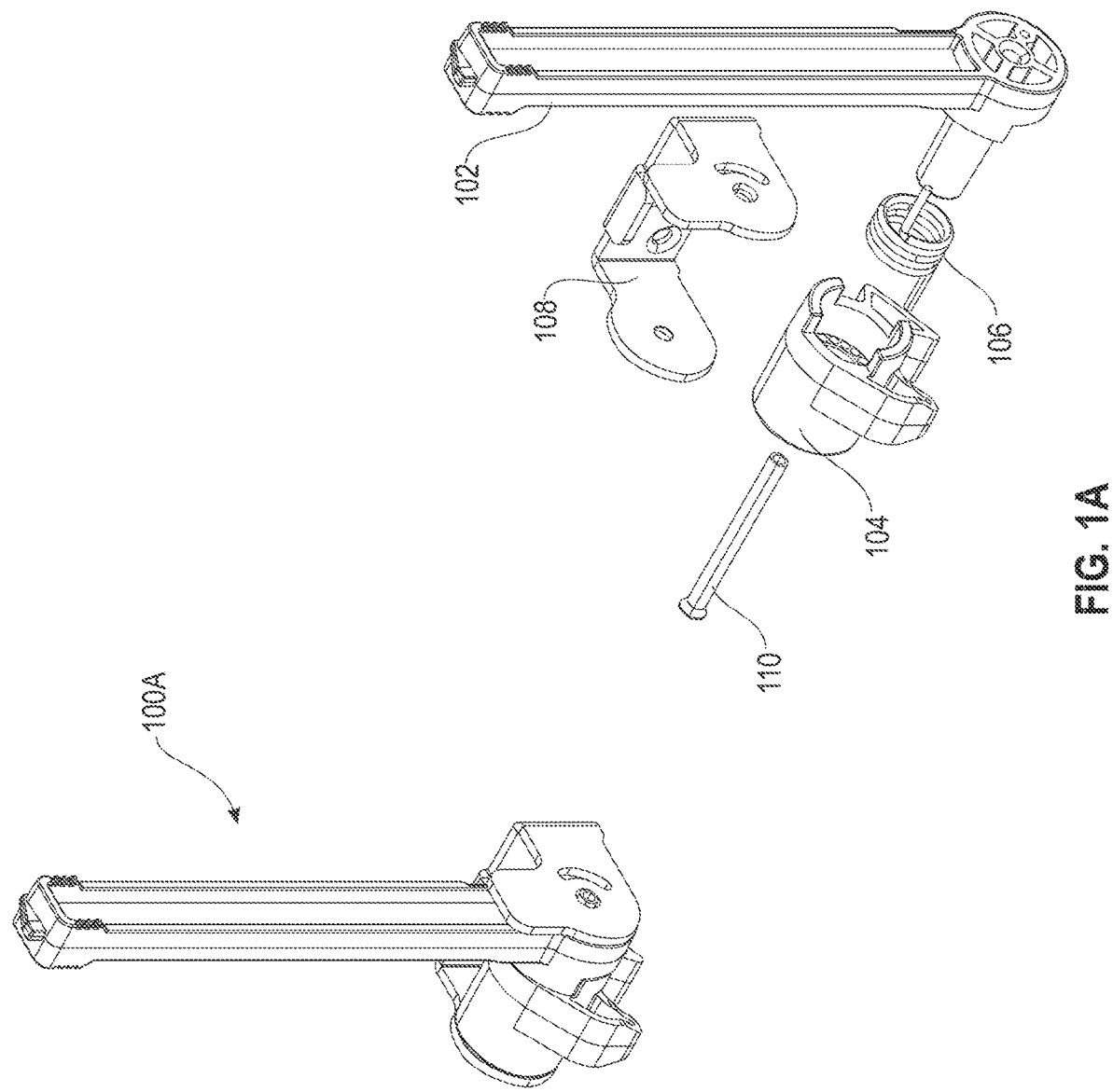

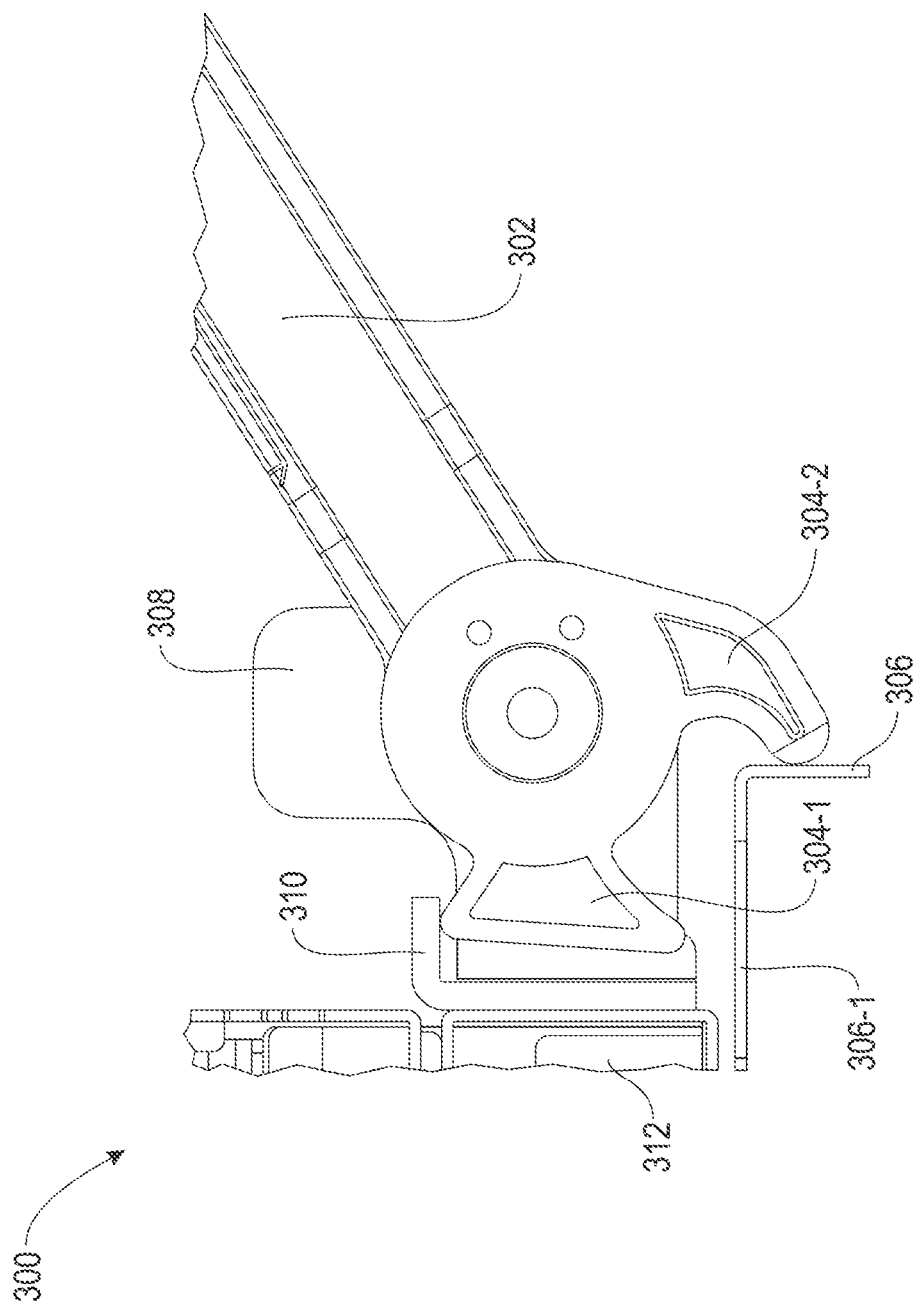

LATCHING A REMOVABLE ELEMENT WITH TOLERANCE-STACK COMPLIANCE

BACKGROUND

The present invention generally relates to removable elements, and more particularly to latching a removable element within a stack of removable elements.

Many electronic devices include removable elements, such as, fans, cards, sub-assemblies, direct access storage device (DASD) carriers, and the like. These elements can be assembled by connecting pairs of removable elements, one element (e.g., a cassette) within another (e.g., a drawer of a server), in a nested configuration. Further, individual removable elements, within the connected pair, may be nested within other removable elements. This and other examples of connected removable elements is referred to as a stack configuration. The matings of the stack can be horizontal and/or vertical in direction, and the removable elements of the stack can be accessible from outside or inside the stack.

SUMMARY

Embodiments are disclosed for a latch assembly apparatus. The latch assembly apparatus includes an effort arm, latch housing, a fulcrum, and a torsion spring. The latch housing includes a resistance arm having a claw portion, and, an ejection arm. The torsion spring is configured to provide a rotational force around the fulcrum, and on the resistance arm, resulting from a tensioning of the torsion spring between a first end of the torsion spring fixed to the effort arm, and a second end of the torsion spring fixed to a predetermined preload hole disposed on the latch housing. Further, when the latch assembly apparatus is mounted to a removable element, and the removable element is placed in a connection with a drawer element by the latch assembly apparatus, the resistance arm applies a preload to the connection.

The present Summary is not intended to illustrate each aspect of, every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

FIG. 1A is an assembled and exploded view of a latch assembly, and an exploded-view of the latch assembly with tolerance-stack compliance for a removable element, in accordance with some embodiments of the present disclosure.

FIG. 4-2 is an exploded internal view of a latch assembly with tolerance-stack compliance for a removable element, in accordance with some embodiments of the present disclosure.

FIG. 4-3 is a latch housing of a latch assembly with tolerance-stack compliance for a removable element, in accordance with some embodiments of the present disclosure.

Figure 1B:
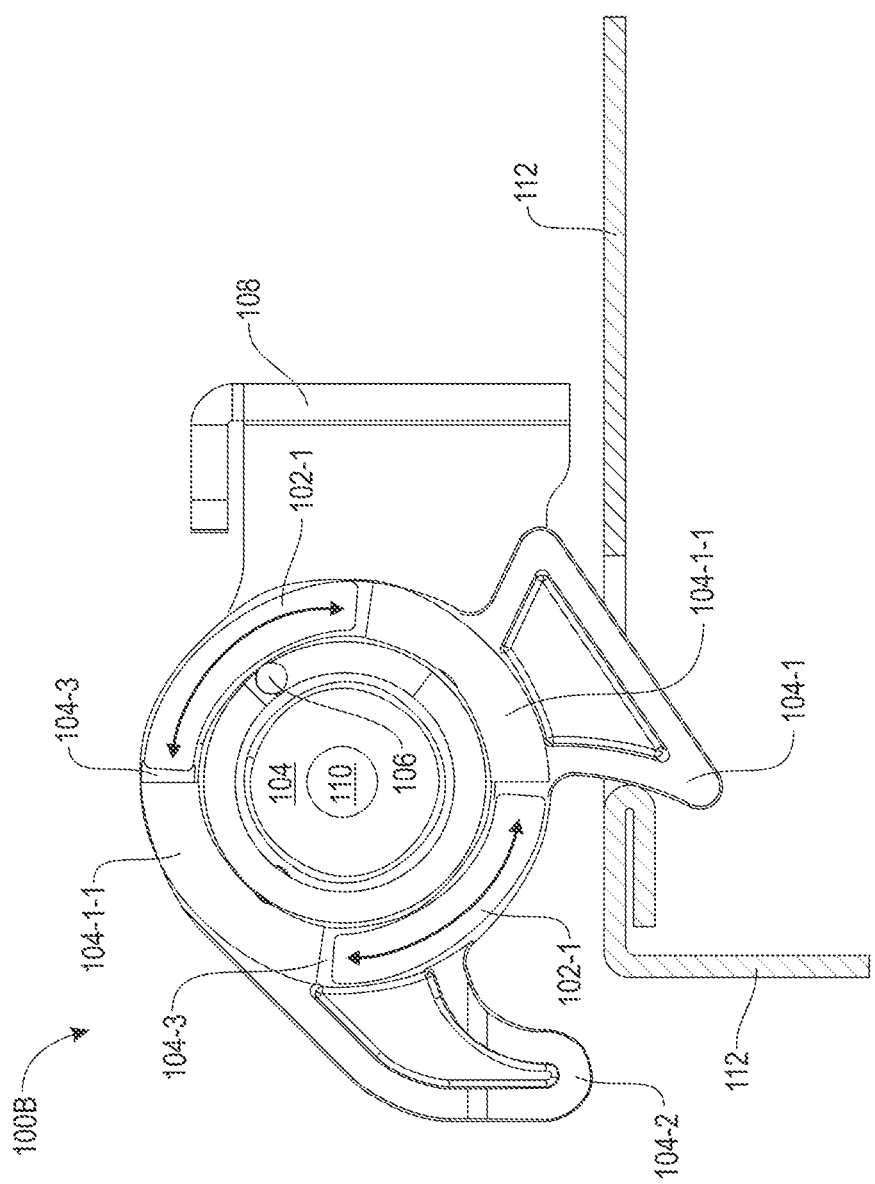
FIG. 1B is an internal side view of a portion of the latch assembly with tolerance-stack compliance for a removable element including a portion of the drawer engagement element, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

As stated previously, removable electronic elements, such as cards and fans, can be assembled in a vertical or horizontal stack of removable elements. Further, these removable elements may be locked, or otherwise secured, in place by a mechanical element (e.g., levers, latches, screws, and the like). In addition to securing the removable elements, these mechanical elements can facilitate additional tasks, such as, providing the mechanical (force) advantage for plugging the removable element connectors together, ejecting removable elements, and the like. The term, mechanical advantage, refers to a ratio of output force produced by a machine to the applied input force.

Additionally, removable electronic elements with nesting connections can use blind-mating connectors. Blind-mating connectors can generally be described as connectors that achieve connection via a sliding or plugging action, and where the connectors cannot be readily observed as they are mated. Accordingly, the design of a latching system for components that include blind-mating connectors has several challenges, including, but not limited to: insertion force, preload, mating alignment, and tolerance-stack compliance. The insertion force refers to overcoming the peak resistance of the connectors. The peak resistance refers to the force threshold for making the connectors connect. Additionally, the peak resistance can be reached at any point of the insertion travel. The preload refers to an amount of force applied to the connection that mitigates loose connections. Loose connections can be damaging because the increase the risk of contact wear in the presence of vibrations.

Tolerance-stack compliance refers to the linear space requirements for mating connectors. More specifically, there can be some variation in the sizes (e.g., physical dimensions) of nested, removable, elements within a stack. This variation in sizes can vary the fittings of each mated pair of elements. Accordingly, the linear space of the stack can be configured to fit within a limited linear space, in a way that permits mating the various paired connectors of stack elements. Thus, a removable element meets tolerance stack compliance by being configured to be plugged into, and removed from, the stack, within a specific linear direction (e.g., horizontal or vertical), without disconnecting any other connected pairs, in light of the cumulative effect of the tolerance of all elements in the stack.

Current solutions include over-docking latches, using flexible parts (either in an effort arm or in the fulcrum of the lever), to compensate for both the preload and the tolerance stack. For example, a latch can include a claw and ejector that each operate from opposing forces with respect to the latch's fulcrum. The claw may direct force from the latch onto the removable element in a way that pushes the element into position to overcome peak resistance and mate the element's connector with the connector of the mating pair. Conversely, the ejector may direct force against a chassis, which may direct the force in a way that disconnects the mated connectors. In some examples, the lever's fulcrum may press on an elastomer element. Alternatively, the lever's fulcrum may be located at the end of a flexible element.

Additionally, previous solutions for the preload use a separate spring mechanism from the latch assembly to apply the preload once a removable unit is fully plugged (e.g., connected). However, this approach adds physical tolerance challenges, cost because of the number of tools, assemblies, and bill of materials components used for the latch and preload functionality. Further, these additional parts take up space, which is at a premium in such configurations. Another issue with this approach is that the incorporation of the spring within a drawer assembly may result in the entire drawer being replaced if the spring is defective or fails, which is costly.

Accordingly, some embodiments of the present disclosure provide a latch assembly having three elements: an effort arm, resistance arm (including a claw), and preload mechanism—in the form of a torsion spring. In this way, such embodiments can provide: tolerance variation between the cassette and drawer, preload force required after cassette is docked across the full tolerance range, and a plug force of the connector that is greater than the preload required. Additionally, such embodiments may enable a field replaceable unit (FRU)-centric approach, rather than an assembly integration-centric design approach, as with current solutions. The FRU-centric approach can provide a less costly solution if the latch assembly is to be replaced. More specifically, if a latch breaks in an FRU-centric approach, substituting a removable element is less costly than changing a whole chassis. However, some embodiments of the present disclosure may not achieve such advantages.

FIG. 1A is an assembled and exploded view of a latch assembly 100A with tolerance-stack compliance for a removable element, in accordance with some embodiments of the present disclosure. The latch 100A includes the effort arm 102, latch housing 104, torsion spring 106, mounting bracket 108, and axle 110. The effort arm 102 is a lever that can be manipulated in opposing directions, to cause the ejection and insertion of a cassette (to which the latch assembly is mounted). Additionally, the latch housing 104 includes elements to facilitate removal, insertion, and preload force application. Further, the latch housing 104 can apply the force from the effort arm 102 onto a chassis, or drawer, for the ejection and insertion. Also, the latch housing 104 can house the torsion spring 106, which is an element that stores and releases rotational energy. Further, the torsion spring 106 may be configured to provide a preload for the cassette while installed (e.g., connected). Additionally, the mounting bracket 108 can attach the latch assembly 100A to the cassette (not shown) for its insertion and ejection. The axle 110 can be a fulcrum pin for the latch assembly 100A.

FIG. 1B is a side view of a portion 100B of the latch assembly 100A with tolerance-stack compliance for a removable element and a portion of a chassis 112, in accordance with some embodiments of the present disclosure. The portion 100B includes elements of the effort arm 102, latch housing 104, torsion spring 106, mounting bracket 108, and axle 110, described with respect to FIG. 1A. Additionally, the portion 100B includes effort arm dog teeth 102-1 and elements of the latch housing 104, specifically, a resistance arm 104-1, resistance arm dog teeth 104-1-1, ejector arm 104-2, and gaps 104-3. The portion of the chassis 112 may represent part of the drawer within which the cassette mounted by the latch assembly 100A is installed. Further, the effort arm dog teeth 102-1 represent elements attached to the effort arm 102 that move in response to movement of the effort arm 102. The resistance arm 104-1 includes a claw in that may be inserted into an opening of the drawer's chassis 112, and thus help secure the mounted cassette into its fully inserted position. Additionally, the resistance arm 104-1 may apply the force to overcome the peak resistance of the cassette's connectors. Further, the resistance arm 104-1 may apply a preload to the cassette. The resistance arm dog teeth 104-1-1 represent elements that interface with the effort arm dog teeth 102-1 in response to movement of the effort arm 102. Additionally, the ejector arm 104-2 may apply the force for ejecting the cassette from its drawer.

According to some embodiments of the present disclosure, the effort arm 102 and resistance arm 104-1 pivot around the same fulcrum (e.g. axle 110) and are connected via a concentric cylindrical barrel of the latch housing 104. As shown, two double sided arrows on the latch housing 104 indicate the opposing directions in which the effort arm 102 and latch housing 104 can rotate in response to manipulation of the effort arm 102. Additionally, the latch housing 104 includes features limiting the relative rotation of the effort arm 102 and resistance arm 104-1. Further, the latch housing 104 includes gaps 104-3 between the rotation limiting features (e.g., the edges of the interfaces between the effort arm 102 and concentric cylinder barrel of the latch housing 104). Additionally, the portion of the effort arm 102 shown includes two-way arrows, indicating that the effort arm 102 is moved in opposing directions, one direction to insert and latch the cassette, and the opposing direction to eject. According to some embodiments of the present disclosure, the peak resistance is overcome when the effort arm 102 is rotated and hits the rotation stop between the two dog teeth. Accordingly, the effort to overcome the peak resistance is higher than the effort to keep the connector fully seated.

Additionally, the effort arm 102 and latch housing 104 can incorporate a multiplicity of holes to tune the installation (e.g., peak resistance) and preload forces. As such, the torsion spring 106 can be inserted in specific holes, which are determined based on the preload. Accordingly, the effort arm 102 and a resistance arm 104-1 can be rotated and the mounted cassette locked in position due to the rotation-limiting features, which enable the transfer of force from the effort arm 102 to the resistance arm 104-1. The effort arm 102 may be rigid and can be made using a variety of materials (e.g., metal, plastic, and other rigid materials.).

Figure 1C:
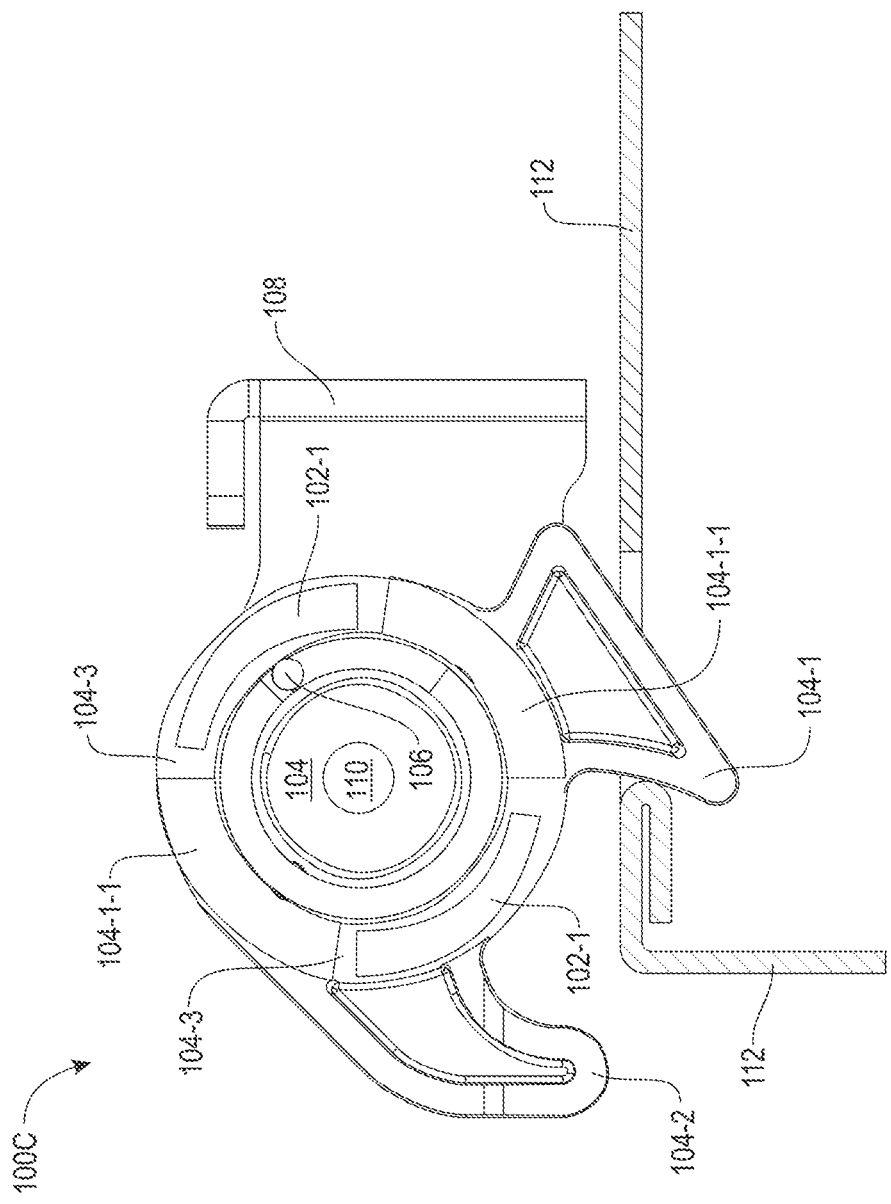
FIG. 1C is an internal side view of a portion of the latch assembly with tolerance-stack compliance for a removable element including a portion of the drawer engagement element, in accordance with some embodiments of the present disclosure.

FIG. 1C is a side view of a portion 100C of the latch assembly 100A with tolerance-stack compliance for a removable element and a portion of a chassis 112, in accordance with some embodiments of the present disclosure. The portion 100C is similar to the portion 100B, and includes elements of the effort arm 102, latch housing 104, torsion spring 106, mounting bracket 108, and axle 110, described with respect to FIG. 1A. Additionally, the portion 100C includes effort arm dog teeth 102-1, resistance arm 104-1, resistance arm dog teeth 104-1-1, ejector arm 104-2, and gaps 104-3, which are similar to the elements described with respect to FIG. 1B. However, the effort arm dog teeth 102-1C represent dog teeth of a different size than the effort arm dog teeth 102-1, enabling a greater range of motion of the effort arm dog teeth 102-1, and a greater angular travel of the effort arm 102, than allowed by the effort arm dog teeth 102-1 described with respect to FIG. 1B. It is noted that the sizes of the effort arm dog teeth 102-1, 102-1C are merely examples, and the size of effort arm dog teeth in embodiments of the present disclosure may vary.

Figure 1D:
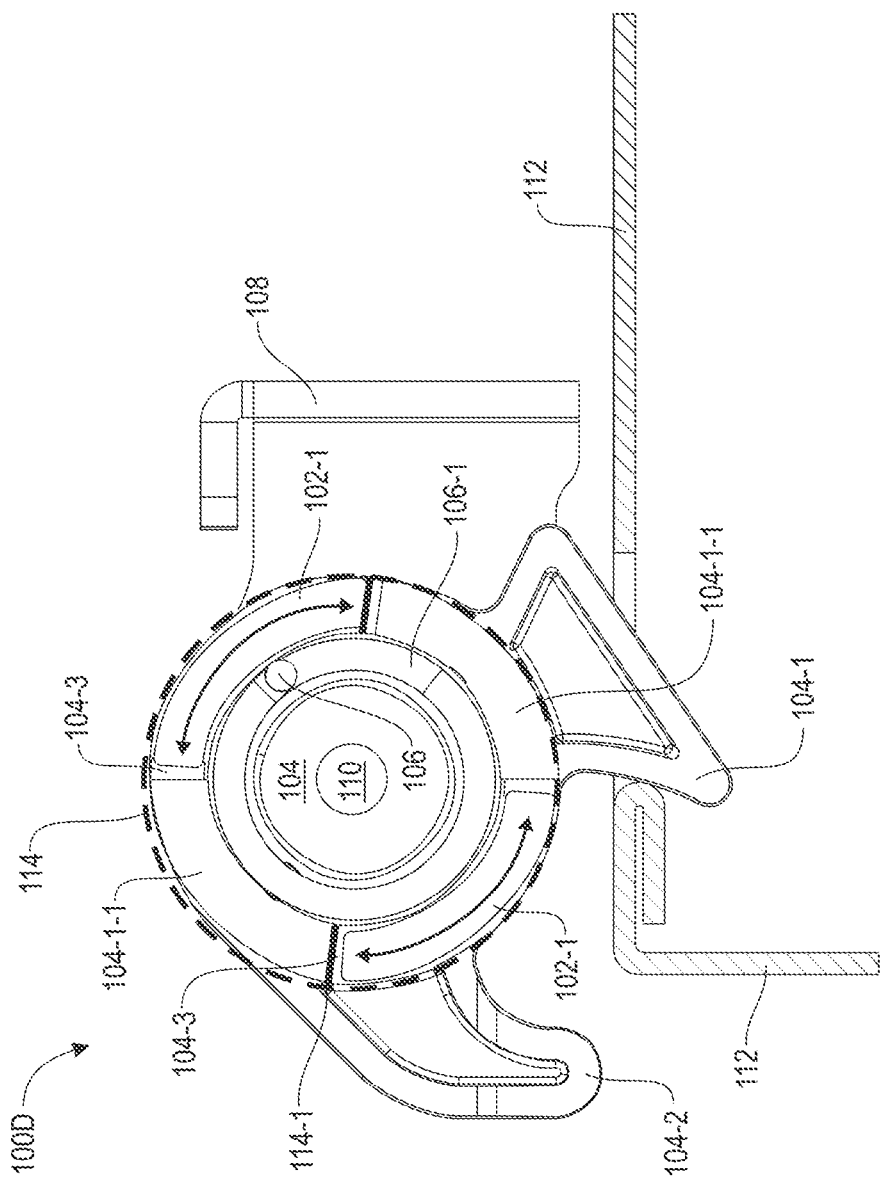
FIG. 1D is an internal side view of a portion of the latch assembly with tolerance-stack compliance for a removable element including a portion of the drawer engagement element, in accordance with some embodiments of the present disclosure.

FIG. 1D is a side view of a portion 100D of the latch assembly 100A with tolerance-stack compliance for a removable element and a portion of a chassis 112, in accordance with some embodiments of the present disclosure. The portion 100D is similar to the portion 100B, and includes elements of the effort arm 102, latch housing 104, torsion spring 106, mounting bracket 108, and axle 110, described with respect to FIG. 1A. Additionally, the portion 100D includes effort arm dog teeth 102-1, resistance arm 104-1, resistance arm dog teeth 104-1-1, ejector arm 104-2, gaps 104-3, which are similar to the elements described with respect to FIG. 1B. Further, the portion 100D includes a shim ring 114, having shim teeth 114-1. The shim ring 114 holds the shim teeth 114-1 in the gaps 104-3, thus reducing the angular travel of the effort arm 102, and the range of motion of the effort arm dog teeth 102-1.

Figure 2:
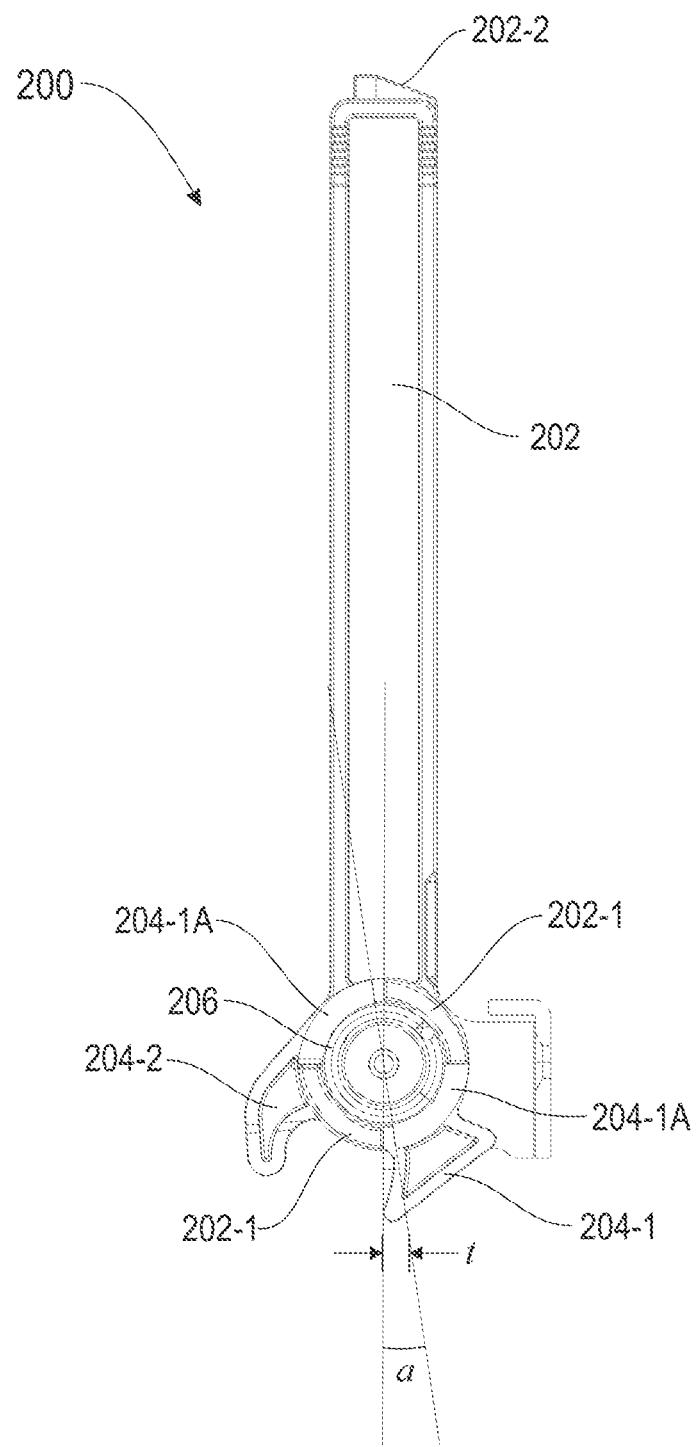
FIG. 2 is an internal side view of a latch assembly with tolerance-stack compliance for a removable element, in accordance with some embodiments of the present disclosure.

FIG. 2 is a side view of latch assembly 200 with tolerance-stack compliance for a removable element, in accordance with some embodiments of the present disclosure. The latch assembly 200 may be similar to the latch assembly 100A described with respect to FIGS. 1A and 1B. The latch assembly 200 includes an effort arm 202, effort arm dog teeth 202-1, effort arm locking mechanism 202-2, latch housing 204 (which includes resistance arm 204-1, resistance arm dog teeth 204-1A, and ejector arm 204-2), and torsion spring 206. The effort arm 202, effort arm dog teeth 202-1, latch housing 204, resistance arm 204-1, resistance arm dog teeth 204-2, and torsion spring 206 are similar to the effort arm 102, effort arm dog teeth 102-1, latch housing 104, resistance arm 104-1, resistance arm 104-1-1, and torsion spring 106 described with respect to FIG. 1A.

According to some embodiments of the present disclosure, the latch assembly 200 can be configured to limit rotation of the resistance arm 204-1 to a predetermined angle. The angular travel indicated with letter, α, determines the resulting linear travel indicated with letter, t, which, given the contact point on the chassis (not shown), results in the linear tolerance, t, of the stack. Further, the torsion spring 206 may enable the preload force of the resistance arm 204-1 when the cassette is inserted.

According to some embodiments of the present disclosure, the latch assembly 200 may insert the cassette with an over docking effort. Over docking involves applying a higher amount of force than the preload during installation. When the effort arm 202 is rotated in the indicated direction, to insert the removable unit (e.g., cassette), and the force applied is higher than the preload requirement for the installed cassette, the resistance arm 204-1 rotates in the same direction (e.g., clockwise) by the angle α, until it hits the rotation stop and the latching motion is complete and the connector is fully inserted. As shown, the effort arm dog teeth 202-1 butt against the resistance arm dog teeth 204-1A, indicating an insertion or ejection scenario. Further, over docking enables a mechanical preload to be applied to the connectors, which can prevent their unseating. Unseating may result due to physical vibration or shock events in the stack. Once the connectors are fully seated, the torsion spring 206 may force the resistance arm 204-1 back to its resting position via a counter-clockwise rotation, to its final stops, thereby applying the preload to the installed cassette. The rotational angle of the resistance arm 204-1 during this movement may be greater than zero but less than α. According to some embodiments of the present disclosure, in latched position, the torsion spring 206 is the only element pressing on the resistance arm 204 (not the effort arm 202) to make sure the latch assembly 200 is within the correct amount of preload. Additionally, a release trigger and catch mechanism (not shown) may maintain the resistance arm 204-1 in its resting position. Alternatively, other mechanisms may be used to maintain the resistance arm 204-1 in its resting position.

Figures 1, 4:
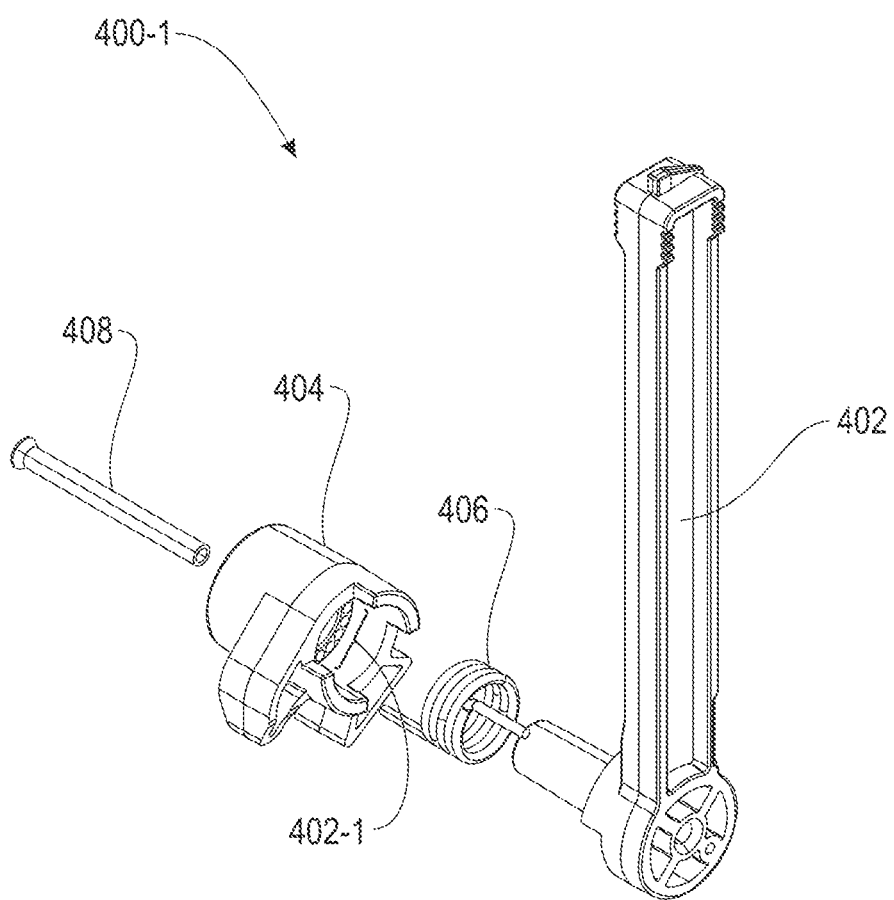
FIG. 4-1 is an exploded internal view of a latch assembly with tolerance-stack compliance for a removable element, in accordance with some embodiments of the present disclosure.
Figures 2, 4:
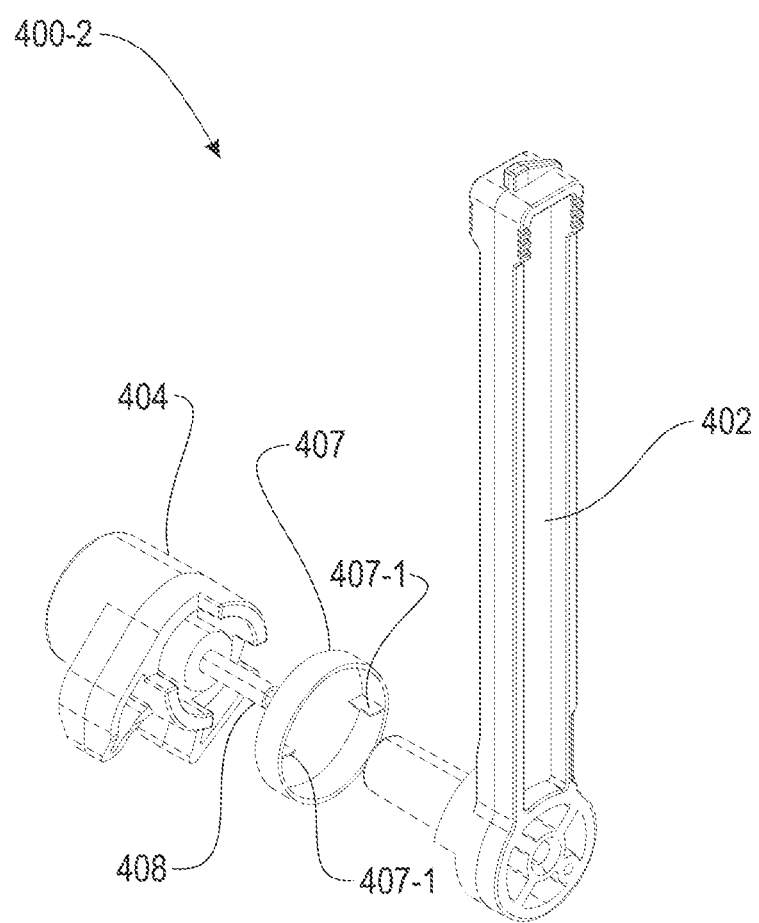
Figures 3, 4:
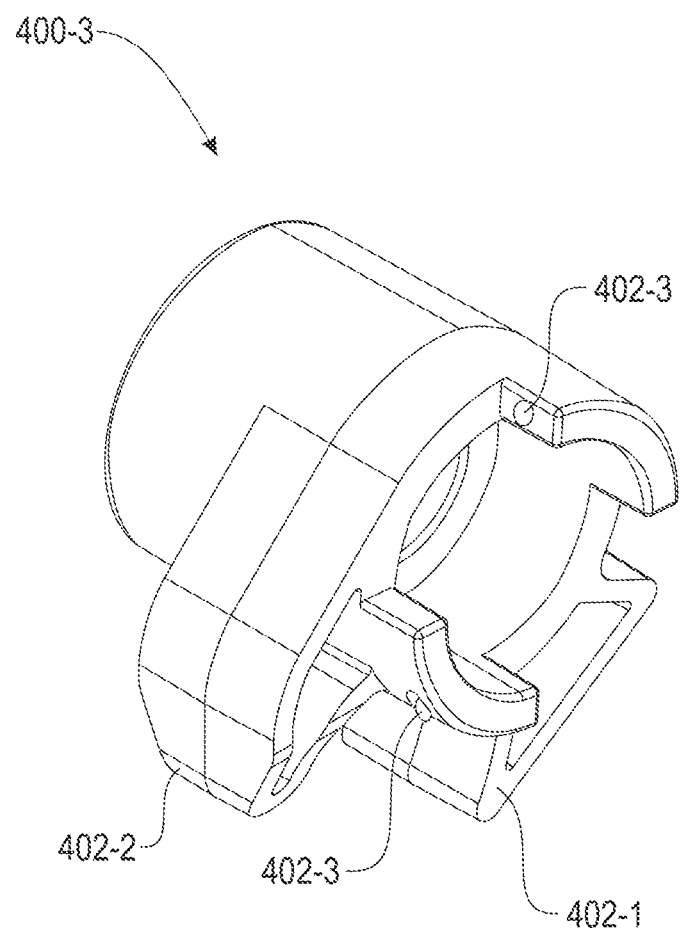
FIG. 3 is a side view of a latch assembly with tolerance-stack compliance for a removable element including a portion of the drawer engagement element, in accordance with some embodiments of the present disclosure.

FIG. 3 is a side view of a latch assembly 300 with tolerance-stack compliance for a removable element, in accordance with some embodiments of the present disclosure. The side view shows a latch assembly 300 in an open position, where the mounted cassette is installed. The side view includes (with some partial views) the effort arm 302, latch housing 304, resistance arm 304-1, ejection arm 304-2, cage sheet metal 306, cage opening 306-1, mounting bracket 308, stop 310, and cassette 312. The effort arm 302, latch housing 304, resistance arm 304-1, ejection arm 304-2, and mounting bracket 308 are similar to the effort arm 102, latch housing 104, resistance arm 104-1, ejection arm 104-2, and mounting bracket 108, described with respect to FIGS. 1A and 1B. Additionally, the cage sheet metal 306 represents a portion of the chassis within which the cassette 312 is installed. The cage opening 306-1 represents a gap between portions of sheet metal configured to hold the resistance arm 304-1 in place when the cassette 312 is installed, and the latch assembly is in a closed position. According to some embodiments of the present disclosure, the stop 310 is a part of the mounting bracket 308, so that when the cassette 312 is installed, and latch assembly is in the open position, the ejector arm 304-2 makes contact with a cage surface (e.g., cage sheet metal 306), and the resistance arm 304-1 makes contact within the opening in the cage that the resistance arm 304-1 is designed to cam off. The term, cam off, means that when the ejector arm 304-2 is in contact with the front of the chassis, force applied by the effort arm to press the ejector arm 304-2 against the chassis, cause the cassette to eject. During ejection, the stop 310 may prevent the resistance arm 304-1 and effort arm 302 from rotating past the angle that ejects the cassette by enough distance to fully disengage the connector. At that point, it is possible to grab the lever and remove the cassette. During installation, the stop 310 keeps the resistance arm 304-1 in position to clear the edge of the chassis. After clearing the edge of the chassis, the ejector arm 304-2 butts against the front of the chassis and forces the whole mechanism (including the effort arm 302) to rotate. In this way, it is possible to press on the effort arm 302 and cam the cassette in.

FIG. 4-1 is an exploded view 400-1 of a latch assembly with tolerance-stack compliance for a removable element, in accordance with some embodiments of the present disclosure. The exploded view 400-1 includes (with some partial views) the effort arm 402, latch housing 404, preload gradient holes 405, torsion spring 406, and axle 408. The effort arm 402, latch housing 404, torsion spring 406, and axle 408 are similar to the effort arm 102, latch housing 104, torsion spring 106, and axle 108, described with respect to FIGS. 1A and 1B. Additionally, the preload gradient holes 405 can be added to the effort arm 402, the latch housing 404 (or both) to tune the preload force for the particular application. The particular application depends on the removable unit for the latch assembly. More specifically, the removable units can have different weights. Further, the preload requirement is a function of the unit weight. As such, the preload varies depending on the weight of the removable unit. Accordingly, by fixing an end of the torsion spring 406 into one of the preload gradient holes 402-1, it is possible to adjust the amount of force that the torsion spring 406 applies against the latch housing, and thus, the resistance arm. Hence, by fixing the end of the torsion spring 406 into different of preload holes 402-1, it is possible to adjust the amount of force from the torsion spring 406. In this way, the preload holes 402-1 provide the latch assembly with a variable preload setting, thus making it possible to tune a preload force into the latch assembly itself. Thus, it is possible to change the preload by installing a different spring (with different tension) and keeping the same holes, or, by inserting one or both ends of the same spring into different hole(s). Alternatively, it is possible to install a different spring and insert the new spring's end(s) into different hole(s)

FIG. 4-2 is an exploded view 400-2 of a latch assembly with tolerance-stack compliance for a removable element, in accordance with some embodiments of the present disclosure. The exploded view 400-2 includes (with some partial views) the effort arm 402, latch housing 404, and axle 408. The effort arm 402, latch housing 404, and axle 408 are similar to the effort arm 102, latch housing 104, and axle 108, described with respect to FIGS. 1A and 1B. Additionally, the exploded view 400-2 includes a ring shim 407 having shim teeth 407-1, which is similar to the shim ring 114, having shim teeth 114-1, described with respect to FIG. 1D.

FIG. 4-3 is a latch housing 400-3 of a latch assembly with tolerance-stack compliance for a removable element, in accordance with some embodiments of the present disclosure. The latch housing 400-3 includes a resistance arm 402-1, ejector arm 402-2, and shim screws 402-3. The resistance arm 402-1 and ejector arm 402-2 may be similar to the resistance arm 104-1 and ejector arm 104-2 described with respect to FIG. 1A. Additionally, the shim screws 402-3 may represent adjustable screws that may be turned to increase or decrease the range of motion and angular travel of the effort arm dog teeth (not shown).

Figure 5:
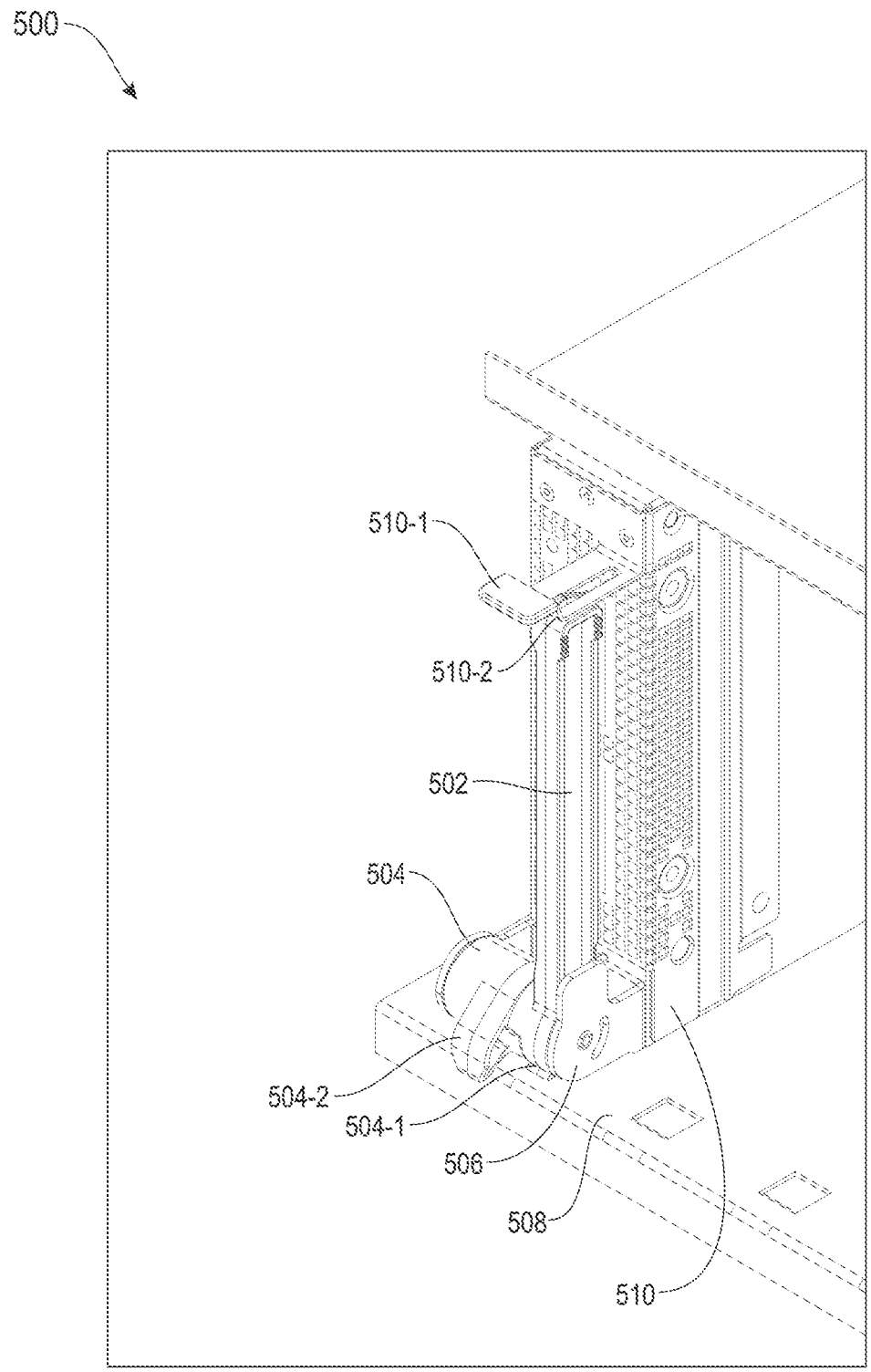
FIG. 5 is a view of a device having a cassette installed in a drawer using a latch assembly with tolerance-stack compliance for a removable element, in accordance with some embodiments of the present disclosure.

FIG. 5 is a view 500 of a device having a cassette installed in a drawer using a latch assembly with tolerance-stack compliance for a removable element, in accordance with some embodiments of the present disclosure. The view 500 includes an effort arm 502, latch housing 504, resistance arm 504-1, ejection arm 504-2, mounting bracket 506, chassis 508, cassette 510, cassette feature 510-1, and effort arm catching feature 510-2. The effort arm 502, latch housing 504, resistance arm 504-1, ejection arm 504-2, and mounting bracket 506 are similar to the effort arm 102, latch housing 104, resistance arm 104-1, ejection arm 104-2, mounting bracket 108, described with respect to FIGS. 1A and 1B. The chassis 508 may represent the enclosing material of the drawer to which the cassette 510 is connecting. For example, the chassis 508 may be a server chassis. The cassette 510 can be a removable element, such as a DASD storage device. The cassette feature 510-1 can be a mechanism configured to hold the effort arm in the closed position once the cassette 510 is installed. Further, the effort arm 502 catching feature 510-2 may be a release mechanism that enables manipulation of the effort arm 502 into an open position.

The view 500 represents an example implementation with a removable cassette 510 inserted in a server chassis 508. In an example installation, the claw of the resistance arm 504-1 presses on the inside edge of openings in the bottom of the chassis 508 as the cassette 510 is being installed. Further, the effort arm 502 may be held into place in its final locked position by a latch or other feature on the tailstock bracket of the cassette 510 that interacts with a feature on the effort arm 502. However, holding the effort arm 502 in its final position is not limited to this example, and can be done using various techniques.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used, and logical, mechanical, electrical, and other changes may be made without departing from the scope of the various embodiments. In the previous description, numerous specific details were set forth to provide a thorough understanding the various embodiments. However, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks. When different reference numbers comprise a common number followed by differing letters (e.g., 100*a*, 100*b*, 100*c*) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category. For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations. Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to one skilled in the art. Therefore, it is intended that the following claims be interpreted as covering all such alterations and modifications as fall within the true spirit and scope of the invention.

What is claimed is:

1. A latch assembly apparatus, comprising:
   an effort arm;
   a latch housing, comprising:
   a resistance arm comprising a claw portion; and
   an ejection arm;
   a fulcrum; and
   a torsion spring configured to provide a rotational force around the fulcrum, and on the resistance arm, resulting from a tensioning of the torsion spring between a first end of the torsion spring fixed to the effort arm, and a second end of the torsion spring fixed to a predetermined preload gradient hole disposed on the latch housing, wherein when the latch assembly apparatus is mounted to a removable element, and the removable element is placed in a connection with a drawer element by the latch assembly apparatus, the resistance arm applies a preload to the connection via the torsion spring.

2. The latch assembly apparatus of claim 1, wherein the removable element meets tolerance-stack compliance of a stack comprising the removable element and the drawer element.

3. The latch assembly apparatus of claim 2, further comprising a mounting bracket configured to mount the latch assembly apparatus to the removable element.

4. The latch assembly apparatus of claim 3, further comprising a stop configured to cause the ejection arm to make contact with a chassis of the drawer element and position the resistance arm outside of a chassis opening, when the effort arm is moved towards an open position.

5. The latch assembly apparatus of claim 4, wherein the latch housing is configured to rotate in a first direction when the effort arm is moved towards a closed position, and during over docking, to rotate in a second direction when rotating in the first direction causes the resistance arm to make contact with the stop, wherein the second direction is opposite from the first direction.

6. The latch assembly apparatus of claim 1, wherein the latch assembly apparatus is configured to apply a force greater than a peak force of the connection when the effort arm is moved towards a closed position.

7. The latch assembly apparatus of claim 1, wherein the latch housing comprises a plurality of rotation limiting features of the latch housing and the effort arm.

8. The latch assembly apparatus of claim 7, wherein the latch housing comprises a plurality of gaps between the plurality of rotation limiting features.

9. The latch assembly apparatus of claim 1, further comprising:
   effort arm dog teeth; and
   resistance arm dog teeth, wherein moving the effort arm brings the effort arm dog teeth into contact with the resistance arm dog teeth.

10. The latch assembly apparatus of claim 9, further comprising a shim ring having shim teeth, wherein the shim teeth are disposed between the effort arm dog teeth and the resistance arm dog teeth, and wherein the shim teeth reduce a range of motion of the effort arm dog teeth by occupying a gap disposed between the effort arm dog teeth and the resistance arm dog teeth.

11. The latch assembly apparatus of claim 9, further comprising two shim screws that are screwed into the latch housing, wherein the two shim screws are adjustable to change a range of motion, and an angular travel, of the effort arm dog teeth.

12. A latch assembly apparatus, comprising:
    an effort arm;
    a latch housing, comprising:
    a resistance arm comprising a claw portion; and
    an ejection arm;
    a fulcrum;
    a torsion spring configured to provide a rotational force around the fulcrum, and on the resistance arm, resulting from a tensioning of the torsion spring between a first end of the torsion spring fixed to the effort arm, and a second end of the torsion spring fixed to a predetermined preload gradient hole disposed on the latch housing, wherein when the latch assembly apparatus is mounted to a removable element, and the removable element is placed in a connection with a drawer element by the latch assembly apparatus, the resistance arm applies a preload to the connection, wherein the removable element meets tolerance-stack compliance of a stack comprising the removable element and the drawer element;

effort arm dog teeth;
resistance arm dog teeth, wherein moving the effort arm brings the effort arm dog teeth into contact with the resistance arm dog teeth; and
a shim ring having shim teeth, wherein the shim teeth are disposed between the effort arm dog teeth and the resistance arm dog teeth, and wherein the shim teeth reduce a range of motion of the effort arm dog teeth by occupying a gap disposed between the effort arm dog teeth and the resistance arm dog teeth.

13. The latch assembly apparatus of claim 12, further comprising a mounting bracket configured to mount the latch assembly apparatus to the removable element.

14. The latch assembly apparatus of claim 13, further comprising a stop configured to cause the ejection arm to make contact with a chassis of the drawer element and position the resistance arm outside of a chassis opening, when the effort is moved towards an open position.

15. The latch assembly apparatus of claim 14, wherein the latch housing is configured to rotate in a first direction when the effort arm is moved towards a closed position, and during over docking, to rotate in a second direction when rotating in the first direction causes the resistance arm to make contact with the stop, wherein the second direction is opposite from the first direction.

16. The latch assembly apparatus of claim 12, wherein the latch assembly apparatus is configured to apply a force greater than a peak force of the connection when the effort arm is moved towards a closed position.

17. The latch assembly apparatus of claim 12, wherein the latch housing comprises a plurality of rotation limiting features of the latch housing and the effort arm, wherein when the removable element is over-docked.

18. A latch assembly apparatus, comprising:
an effort arm;
a latch housing, comprising:
a resistance arm comprising a claw portion; and
an ejection arm;
a fulcrum;
a mounting bracket configured to mount the latch assembly apparatus to a removable element;
a torsion spring configured to provide a rotational force around the fulcrum, and on the resistance arm, resulting from a tensioning of the torsion spring between a first end of the torsion spring fixed to the effort arm, and a second end of the torsion spring fixed to a predetermined preload gradient hole disposed on the latch housing, wherein when the latch assembly apparatus is mounted to the removable element, and the removable element is placed in a connection with a drawer element by the latch assembly apparatus, the resistance arm applies a preload to the connection, wherein the removable element meets tolerance-stack compliance of a stack comprising the removable element and the drawer element;
effort arm dog teeth;
resistance arm dog teeth, wherein moving the effort arm brings the effort arm dog teeth into contact with the resistance arm dog teeth; and
two shim screws that are screwed into the latch housing, wherein the two shim screws are adjustable to change a range of motion, and an angular travel, of the effort arm dog teeth.

19. The latch assembly apparatus of claim 18, wherein the latch housing is configured to rotate in a first direction when the effort arm is moved towards a closed position, and during over docking, to rotate in a second direction when rotating in the first direction causes the resistance arm to make contact with a stop, wherein the second direction is opposite from the first direction.

20. The latch assembly apparatus of claim 18, wherein the latch assembly apparatus is configured to apply a force greater than a peak force of the connection when the effort arm is moved towards a closed position.

* * * * *